(12) United States Patent
Mikawa et al.

(10) Patent No.: US 10,778,994 B2
(45) Date of Patent: Sep. 15, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Takuma Mikawa, Yokohama (JP); Toru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 15/947,957

(22) Filed: Apr. 9, 2018

(65) Prior Publication Data
US 2018/0302635 A1 Oct. 18, 2018

(30) Foreign Application Priority Data

Apr. 14, 2017 (JP) ................................. 2017-080786

(51) Int. Cl.
| | |
|---|---|
| *H04N 19/30* | (2014.01) |
| *H04N 19/63* | (2014.01) |
| *H04N 19/48* | (2014.01) |
| *H04N 19/40* | (2014.01) |
| *H04N 19/33* | (2014.01) |

(52) U.S. Cl.
CPC ............. *H04N 19/30* (2014.11); *H04N 19/33* (2014.11); *H04N 19/40* (2014.11); *H04N 19/48* (2014.11); *H04N 19/63* (2014.11)

(58) Field of Classification Search
CPC ........ H04N 19/30; H04N 19/33; H04N 19/40; H04N 19/48; H04N 19/63

USPC ......................................................... 382/225
See application file for complete search history.

(56) References Cited

U.S. PATENT DOCUMENTS

| | | | | |
|---|---|---|---|---|
| 2005/0244065 | A1* | 11/2005 | Malvar | G06K 9/36 382/239 |
| 2011/0246628 | A1* | 10/2011 | Suzuki | H04L 61/1582 709/220 |
| 2013/0121588 | A1* | 5/2013 | Noguchi | H04N 19/17 382/195 |
| 2017/0064329 | A1* | 3/2017 | Lawrence | H04N 19/114 |
| 2017/0150091 | A1* | 5/2017 | Nakase | H04N 9/8042 |

FOREIGN PATENT DOCUMENTS

JP  2009-302638 A  12/2009

* cited by examiner

*Primary Examiner* — Amandeep Saini
(74) *Attorney, Agent, or Firm* — Cowan, Liebowitz & Latman, P.C.

(57) ABSTRACT

An image processing apparatus, comprising a decompression unit configured to decompress a compressed raw moving image file to generate an uncompressed raw moving image file, wherein the decompression unit generates a full-size uncompressed raw moving image file from full-size uncompressed raw image data obtained by decompressing each of a plurality of pieces of compressed raw image data included in the compressed raw moving image file, and when the compressed raw image data is data that has been hierarchically compressed, generates a reduced-size uncompressed raw moving image file from reduced-size uncompressed raw image data obtained by decompressing some data of each of the plurality of pieces of compressed raw image data.

10 Claims, 4 Drawing Sheets

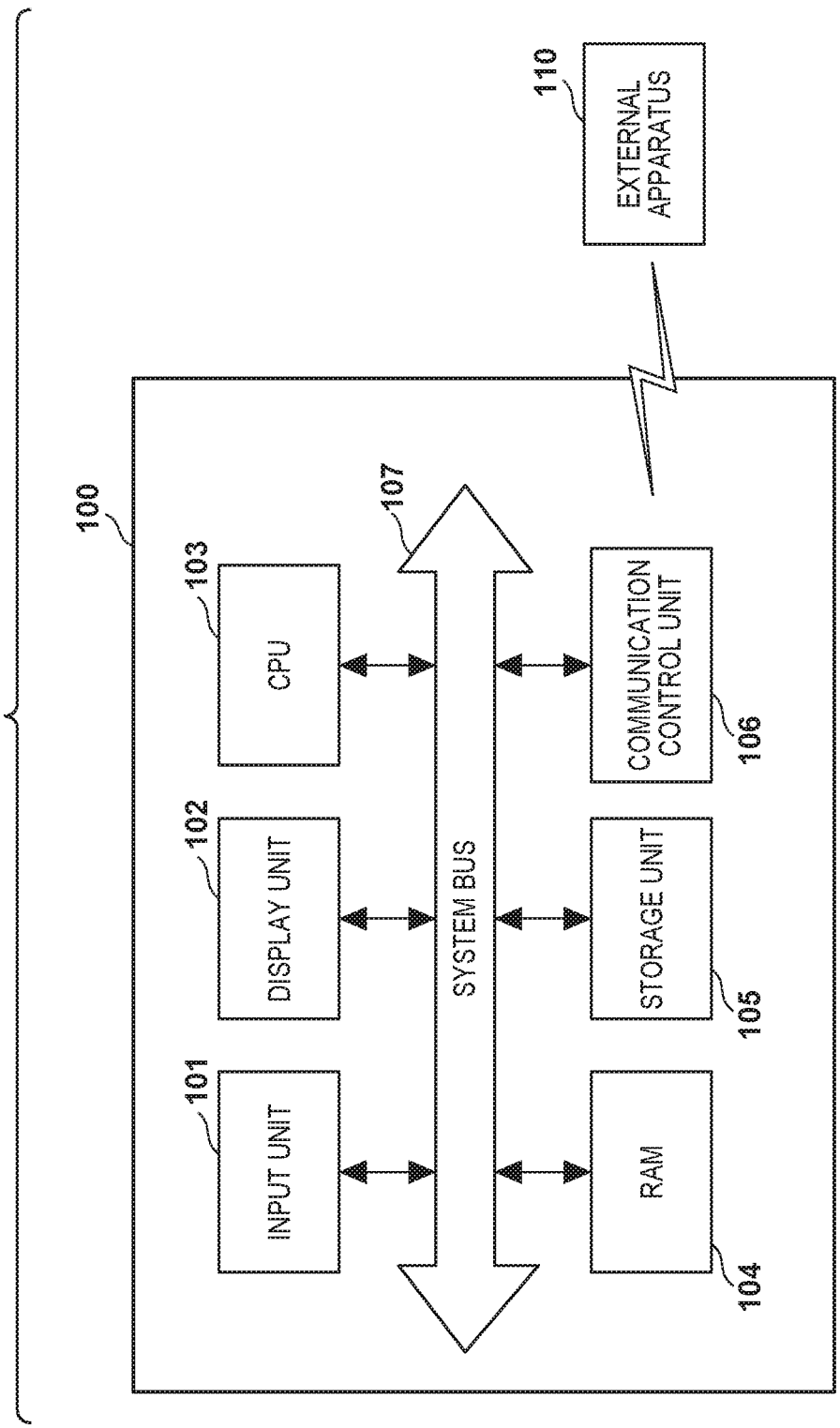

FIG. 2A
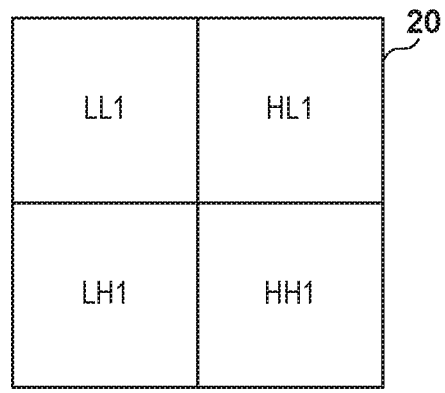
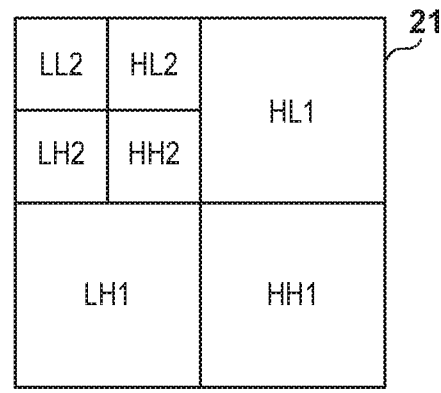
DIVISION LEVEL = 1
(H: HIGH FREQUENCIES,
L: LOW FREQUENCIES)
DIVISION LEVEL = 2
(H: HIGH FREQUENCIES,
L: LOW FREQUENCIES)
FIG. 2B
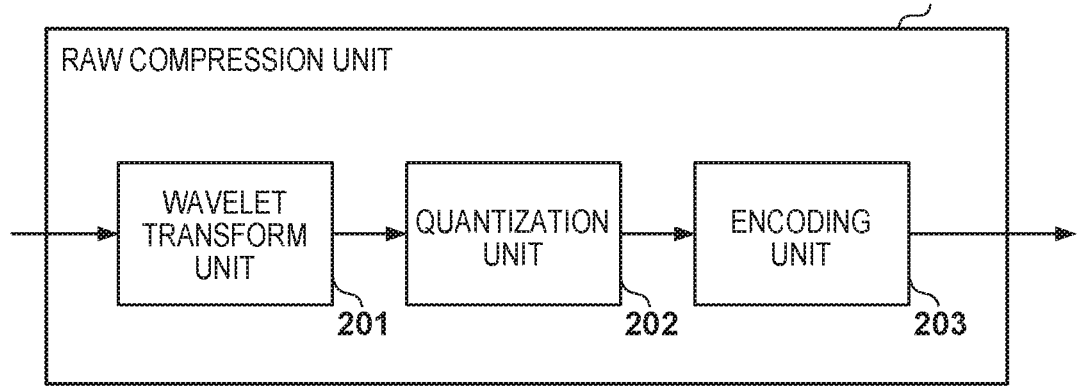
FIG. 2C
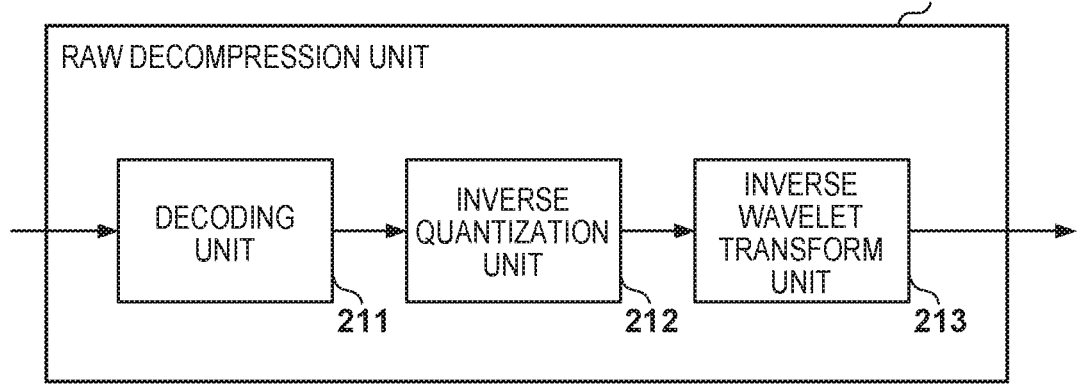

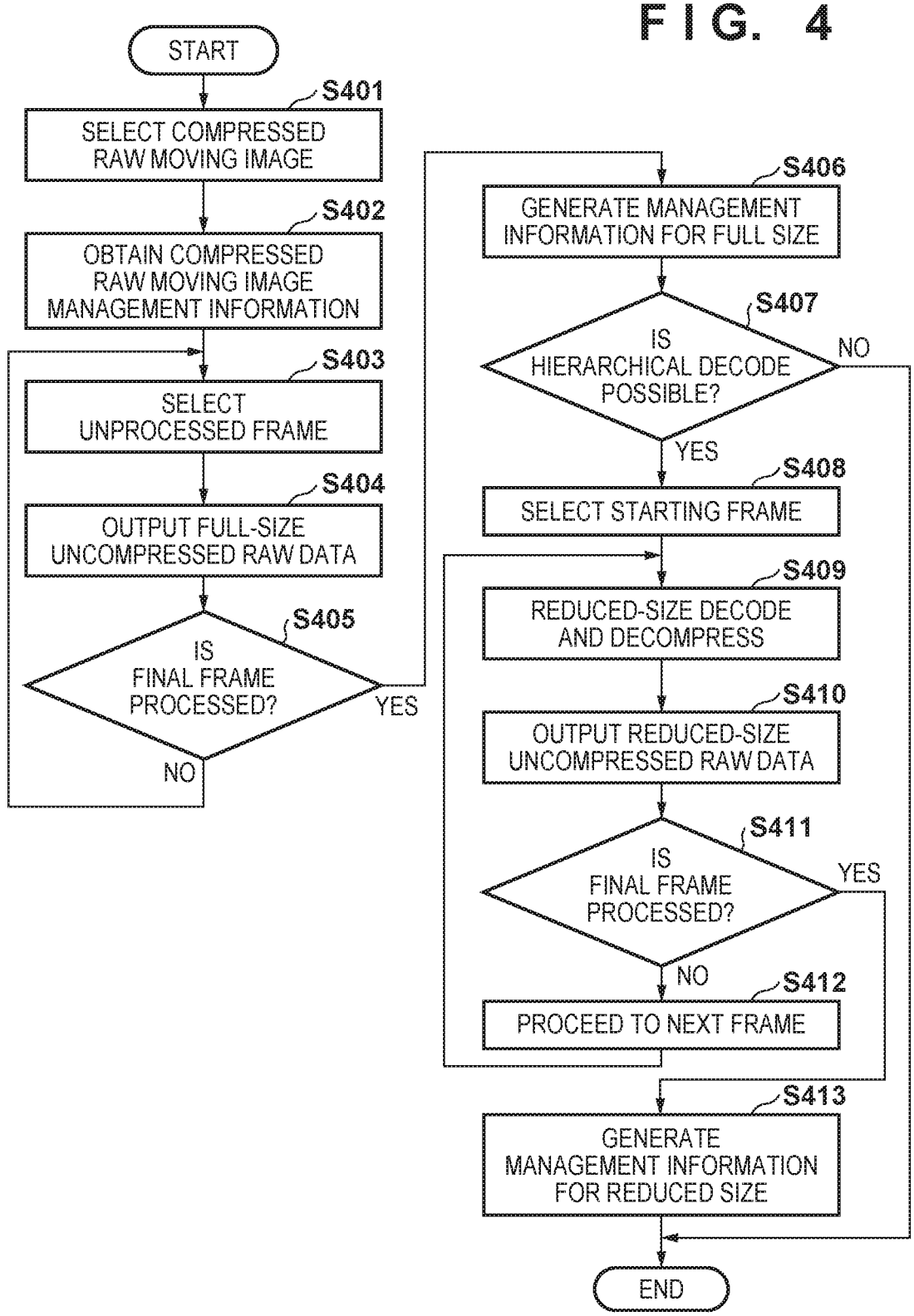

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The invention relates to an image processing apparatus, an image processing method, and a non-transitory computer-readable storage medium.

Description of the Related Art

Saving raw data obtained from an image capturing element having a Bayer arrangement as a raw image file or a raw moving image file is performed. Because a data amount for this raw data is very large, methods for compressing raw data when creating a file have been proposed. For example, a technique for using wavelet transforms has been proposed as a method of compressing of raw moving images (refer to Japanese Patent Laid-Open No. 2009-302638).

By using wavelet transforms, it becomes possible to hierarchically compress raw data at a particular decomposition level based on a sub-band, and, for each hierarchical layer, decode the original raw data by decompressing in units of sub-bands (hereinafter, referred to as a "hierarchical decode"). It becomes possible to select a necessary sub-band in accordance with a resolution or the like that is necessary, and decode at a small size (a reduced size) in addition to full-size. In other words, by decoding at a small size (for example ¼), image processing such as high-speed output or reproduction where a processing load has been reduced becomes possible.

A hierarchical decode is possible for raw moving image obtained by the method of compressing a raw moving image described above, but compatibility in a workflow is less in comparison to conventional raw moving image that cannot be subject to a hierarchical decode. Accordingly, usage by making a conversion to a conventional raw moving image is considered. In contrast, because a conventional raw moving image cannot be subject to a hierarchical decode, there is a necessity to always handle full-size images, and performing image processing with a reduced processing load is difficult. In other words, when a raw moving image that can be subject to a hierarchical decode is converted into a conventional raw moving image that cannot be subject to a hierarchical decode, image processing having a reduced processing load becomes difficult.

SUMMARY OF THE INVENTION

A technique for, when decoding a compressed raw moving image, enabling image processing with a reduced processing load while maintaining compatibility in a workflow is provided.

One aspect of embodiments of the invention relates to an image processing apparatus, comprising a decompression unit configured to decompress a compressed raw moving image file to generate an uncompressed raw moving image file, wherein the decompression unit generates a full-size uncompressed raw moving image file from full-size uncompressed raw image data obtained by decompressing each of a plurality of pieces of compressed raw image data included in the compressed raw moving image file, and when the compressed raw image data is data that has been hierarchically compressed, generates a reduced-size uncompressed raw moving image file from reduced-size uncompressed raw image data obtained by decompressing some data of each of the plurality of pieces of compressed raw image data.

Further features of the invention will become apparent from the following description of exemplary embodiments (with reference to the attached drawings).

BRIEF DESCRIPTION OF THE DRAWINGS

FIG. 1 is a block diagram illustrating an example of a configuration of an image processing apparatus according to embodiments of the invention.

FIG. 2A is a view for describing an example of a sub-band division at a time of a wavelet transform, according to embodiments of the invention.

FIG. 2B is a block diagram illustrating an example of a configuration of a raw compression unit according to embodiments of the invention.

FIG. 2C is a block diagram illustrating an example of a configuration of a raw decompression unit according to embodiments of the invention.

FIG. 4 is a flowchart illustrating an example of processing according to a second embodiment of the invention.

DESCRIPTION OF THE EMBODIMENTS

Figure 3:
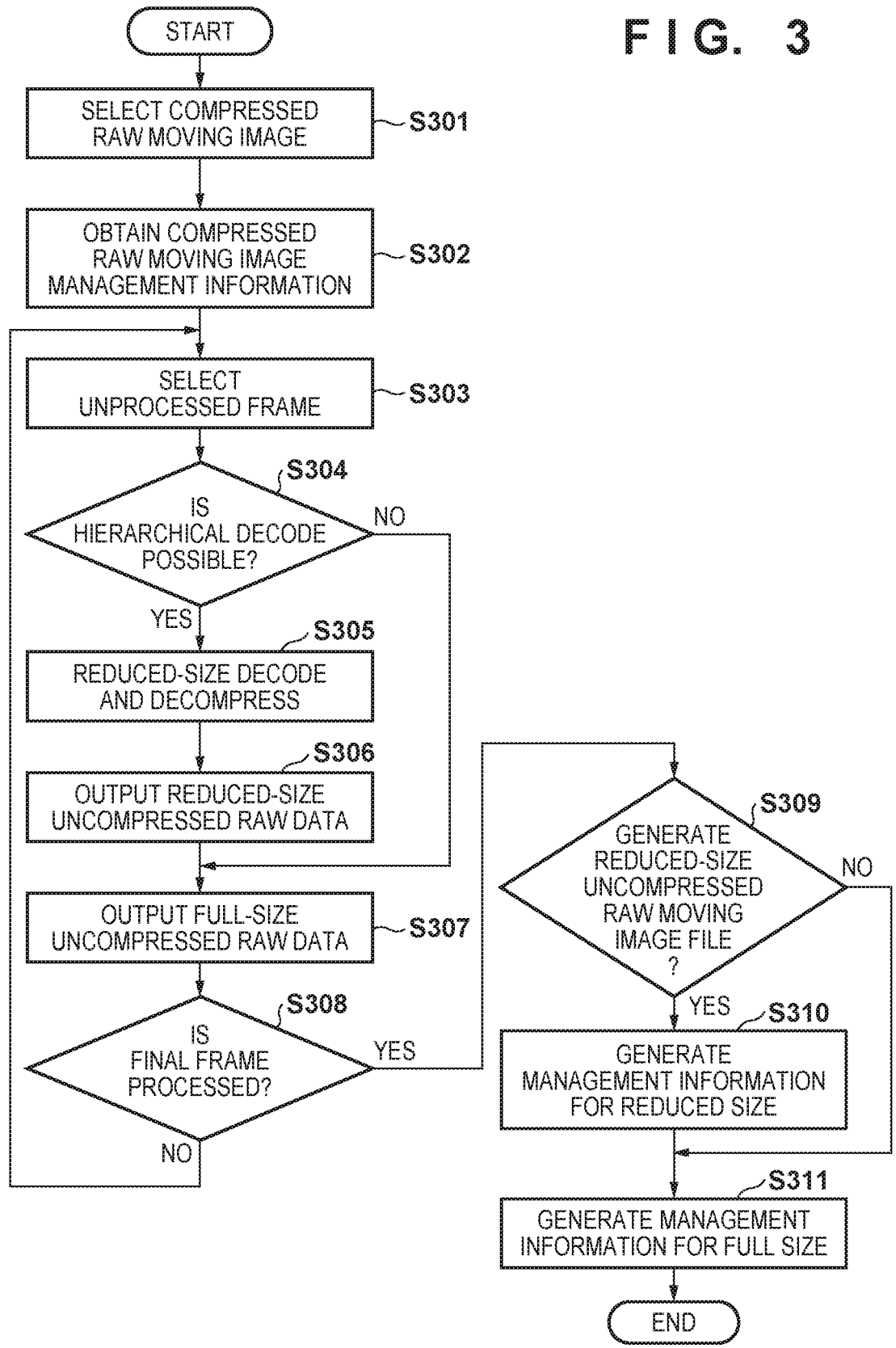
FIG. 3 is a flowchart illustrating an example of processing according to a first embodiment of the invention.

Hereinafter, embodiments of the invention will be described in detail, based on the attached drawings.

First Embodiment

With reference to FIG. 1 through FIG. 3, description is given below regarding a first embodiment of the invention. In the present embodiment, description is given of an example of a personal computer (PC) that executes an image processing program (application software), as an image processing apparatus. However, the image processing apparatus can be realized by any information processing apparatus, image encoding decoding apparatus, image reproduction apparatus, an image recording apparatus, image compression apparatus, image capturing apparatus, or the like, such as a digital camera, a digital video camera, a mobile telephone, a smart phone, a PDA, a tablet terminal, or a mobile media player, for example. In any apparatus, the invention can be implemented by the apparatus executing an image processing program corresponding to an embodiment of the invention.

In the present embodiment, illustration is given of an example in which an image processing apparatus 100 converts a compressed raw moving image that can be subject to a hierarchical decode to an uncompressed raw moving image that cannot be subject to a hierarchical decode, and saves the uncompressed raw moving image. In the present embodiment, description is given of an example of an "uncompressed raw moving image" as a file that has been saved, but a raw moving image of another format may be used. In addition, description is given of an example in which, when application software of the present embodiment handles a compressed raw moving image that can be subject to a hierarchical decode, a (full-size) uncompressed raw moving image having the same image size as the original moving image, and a (reduced-size) uncompressed raw moving image reduced to ½ the width and ½ the height of the image size of the original moving image (in other words, ¼ the image size) are saved. It is envisioned that the reduced-size uncompressed raw moving image will be used as a proxy file in a subsequent workflow. Note that the image size of ¼ is only an example, and saving in another reduced size may be performed, and saving in a plurality of types of reduced sizes may be performed.

In the present embodiment, description is given of a case of using wavelet compression processing as a form for hierarchically compressing and encoding a raw moving image. However, the invention may be applied to a case of using a method other than wavelet compression processing if there is a form that enables raw image data that is a processing target to be hierarchically subject to compression encoding processing (encoded) and subject to decompression processing in units of hierarchical layers (decoded). In addition, an ISO-based file format compatible file is given as a container, but another container may be used.

FIG. 1 is a block diagram illustrating an example of a configuration of an image processing apparatus 100 according to embodiments of the invention. An input unit 101 includes a keyboard or a pointing device, and accepts a control instruction such as from a button displayed on a display unit 102. Note that a mouse, a trackball, a tablet or the like may be given as a pointing device. The display unit 102 is configured by a CRT, an LCD, or the like for example, and displays a GUI (Graphical User interface) screen or image data. A CPU 103 is a control unit for controlling operation of the entirety of the image processing apparatus 100. A RAM 104 provides the CPU 103 with a work region necessary for various processing by the image processing apparatus 100. A control program and an image processing program that are stored in a storage unit 105 are executed by the CPU 103 after first being read into the RAM 104.

The storage unit 105 stores the control program and the image processing program which are necessary for various processing by the image processing apparatus 100, as well as a moving image file, a compressed raw moving image file, or the like. Description is given later regarding the image processing program of the present embodiment. The storage unit 105 may be configured by a built-in large capacity memory or a hard disk, and may be configured to be further provided with an attachable/detachable type memory card. Furthermore, it may be a storage apparatus that is connected with the image processing apparatus 100 via a network. A communication control unit 106 uses USB (Universal Serial Bus), Ethernet, or the like as a communication interface to connect to an external apparatus 110. The external apparatus 110 includes a server for holding a raw moving image file that is installed on the network, as well as any apparatus having a function for holding a raw moving image file. In addition, in place of a wired connection that uses a communication cable, a wireless connection configuration may be used.

Each unit described above is connected by a system bus 107. Although description is given of an example in which an image processing program is stored in the storage unit 105 in the present embodiment, the invention applies even to a case where a program is on a network or external storage unit that is connected to the communication control unit 106.

Description is thus given, with reference to FIG. 1, for a configuration of the image processing apparatus 100 in a case where it is configured as a PC. However, the image processing apparatus 100 can also be configured as an apparatus that that has an image capturing function and can generate and store the raw image, as with a digital camera. In such a case, the image processing apparatus 100 can be configured so as to include an image capturing optical system such as a lens, and an image capturing unit that includes an image capturing sensor.

FIG. 2A is a view for describing an example of a sub-band division at a time of a wavelet transform, according to embodiments of the invention. In a wavelet transform, by applying a spatial frequency band division in accordance with a low-pass filter and a high-pass filter, and down-sampling to an input image, an LL1 block for a horizontal low-frequency component and a vertical low-frequency component, a HL1 block for a horizontal high-frequency component and vertical low-frequency component, an LH1 block for a horizontal low-frequency component and a vertical high-frequency component, and a block for a horizontal high-frequency component and a vertical high-frequency component are obtained. Here, out of the four sub-bands of LL1, LH1, HL1, and HH1, the LL1 block is the sub-band (low frequency band) closest to low frequencies in the same decomposition level (hierarchical layer), and is an image whose horizontal and vertical resolutions are both half those of the input image.

An example indicated by reference numeral 20 of FIG. 2A illustrates a case where a sub-band division level=1. In addition, a case where the sub-band division level=2 achieved by applying similar processing to LL1 in the example 20 is indicated by reference numeral 21. In the case where the sub-band division level=2, LL1 is further divided into four sub-bands: LL2, LH2, HL2, and HH2. In addition, the sub-band division level may be set to three or more.

Next, with reference to FIG. 2B, description is given regarding compression processing of a raw image. FIG. 2B is a view illustrating an example of a configuration of a raw compression unit 200 that corresponds to the present embodiment. The raw compression unit 200 converts inputted uncompressed raw image data that is a target of the compression processing to raw image data in a compressed state by wavelet compression processing, and outputs the raw image data in the compressed state. The outputted raw image data is held in an external buffer (in the RAM 104), and this encoded data that is the raw image data can be temporarily held for subsequent processing. In addition, when the raw image is a portion of a raw moving image, a raw moving image file is generated from a plurality of pieces of raw image data, and saved in a memory card, the external apparatus 110, or the like.

The raw compression unit 200 can comprise a wavelet transform unit 201, a quantization unit 202, and an encoding unit 203. The wavelet transform unit 201 performs wavelet transform processing described above on the inputted raw image, divides the raw image into a plurality of sub-bands, and outputs respective transformation coefficients. The quantization unit 202 quantizes, by each sub-band, the coefficients obtained by the wavelet transform, and outputs the quantized coefficients to the encoding unit 203. The encoding unit 203 compresses the quantized coefficients by an encoding method such as Golomb coding, for example, and outputs the compressed quantized coefficients as compressed raw image data.

At this point, the raw compression unit 200 can have the encoded compressed raw image data include flag information indicating that the data has been hierarchically compression encoded (can be subject to a hierarchical decode). In addition, the encoded compressed raw data can include information indicating a data size, or information indicating a bit position for LL1 (or LLn) in the compressed raw image data. Note that information commonly provided for a plurality of raw images that are a portion of a raw moving image can be included in management information of the raw moving image file. For example, flag information indicating that a hierarchical decode can be performed may be included in the management information of a raw moving image file. For example, if a raw moving image file has an ISO-based file format, it is possible to use codingname of VisualSampleEntry which indicates a data format as flag information that indicates whether a hierarchical decode is possible. In addition, the management information of a raw moving image file can include, as information relating to the raw moving image file, information relating to a number of frames, a position in the file for each frame, information relating to size, or the like.

Next, with reference to FIG. 2C, description is given regarding decompression processing for compressed raw image data generated by the wavelet compression processing described above. FIG. 2C is a view illustrating an example of a configuration of a raw decompression unit 210 that corresponds to the present embodiment. A raw decompression unit 210 decompresses inputted compressed raw image data, converts it to uncompressed raw image data, and outputs the uncompressed raw image data. The outputted uncompressed raw image data is held in an external buffer, and can be temporarily held for subsequent processing as a raw image. The raw decompression unit 210 can comprise a decoding unit 211, an inverse quantization unit 212, and an inverse wavelet transform unit 213. The decoding unit 211 decompresses compressed quantized coefficients that were compressed by an encoding method such as Golomb coding, for example, and restores the quantized coefficients. The obtained quantized coefficients are outputted to the inverse quantization unit 212. The inverse quantization unit 212 converts the quantized coefficients to wavelet transform coefficients for each sub-band, and outputs them to the inverse wavelet transform unit 213. The inverse wavelet transform unit 213 synthesizes a sub-band image obtained based on inputted wavelet transform coefficients to restore and output the uncompressed raw image. Here, the compressed raw image data is compression encoded by sub-band for a respective decomposition level, and the wavelet the decompression processing can execute the decompression processing after obtaining the encoded data of a sub-band of a desired decomposition level from the compressed raw image data.

In the present embodiment, the raw compression unit 200 and the raw decompression unit 210 may be configured from hardware by using a dedicated logic circuit and a memory. Alternatively, they may be configured from software by the CPU 103 executing the image processing program stored in the storage unit 105. In the following description, description is given of a case where the CPU 103 functions as the raw compression unit 200 and the raw decompression unit 210.

Referring to FIG. 3, description is given of processing corresponding to an embodiment of the invention. In the present embodiment, description is given for processing where the CPU 103 converts a compressed raw moving image file to an uncompressed raw moving image file, and saves the uncompressed raw moving image file. Processing corresponding to the flowchart of FIG. 3 is realized by the CPU 103 using and executing an image processing program corresponding to the present embodiment that is stored in the storage unit 105, with the RAM 104 as a work memory. The RAM 104 is also used as a temporary holding region for image data that the CPU 103 processes.

Here, it is assumed that, without newly designating the file name of an uncompressed raw moving image file that is to be saved, saving is performed with a file name resulting by adding "_full" and "_proxy" at the end of the file name of a target compressed raw moving image file. In the case where the file name of a compressed raw moving image file is "movie.raw" for example, the file name of the uncompressed raw moving image having the same image size as the original moving image is set as "move_full.raw", and the file name of a reduced-size uncompressed raw moving image is set to "movie_proxy.raw".

Firstly, the CPU 103 selects a compressed raw moving image file that is a processing target in step S301. This selection can be based on a designation of a compressed raw moving image file performed by a user of the image processing apparatus 100, for example. Here, the compressed raw moving image file that is the processing target may be a file generated by the raw compression unit 200, and may be a file that is generated by an external apparatus and saved in the image processing apparatus 100 or a file received from the external apparatus.

Next, in step S302, the CPU 103 obtains management information of the selected compressed raw moving image file. The compressed raw moving image file may be stored in the storage unit 105, or may be received from the external apparatus 110 via the communication control unit 106, Here, the CPU 103 can hold the obtained management information in the RAM 104.

In step S303, the CPU 103 selects compressed raw image data for an unprocessed frame out of the compressed raw moving image file. Next, in step S304, the CPU 103 determines, based on the management information obtained in step S302, whether the compressed raw image data is data that is hierarchically compressed and encoded, in other words whether it is data for which a hierarchical decode is possible. In the case where a hierarchical decode is possible, the processing proceeds to step S305. In the case where a hierarchical decode is impossible, the processing proceeds to step S307. In step S305, the CPU 103 decodes and decompresses the LL1 block which is a portion of data out of the selected one frame's worth of compressed raw image data, and generates reduced-size uncompressed raw image data. This uncompressed raw image data is created from the LL1 block, and thus has an image size that is ¼ that of the original raw image, as described above.

Next, in step S306, the CPU 103 outputs the reduced-size uncompressed raw image data generated in step S305 as a reduced-size uncompressed raw moving image file. At this point, when outputting the first frame the file is newly created, but for second and subsequent frames, the newly generated reduced-size uncompressed raw image data is added to the file that is already there. The generated reduced-size uncompressed raw moving image file may be saved in the storage unit 105, and may be transmitted to the external apparatus 110 via the communication control unit 106 to be saved. In the present embodiment, it is assumed that the reduced-size uncompressed raw moving image file is saved in the same folder as the compressed raw moving image file.

Next, in step S307, the CPU 103 generates and outputs full-size uncompressed raw image data by decoding and decompressing the one frame's worth of compressed raw image data selected in step S303. At this point, if the uncompressed raw image data is already generated in step S306, because LL1 is already decoded and decompressed, the HL1 block, the LH1 block, and the HH1 block are decoded and decompressed, and combined with the LL1 block that has been decoded and decompressed to generate full-size uncompressed raw image data. In a case where compressed raw moving image data that cannot be subject to a hierarchical decode is a processing target, in this step it is decoded and decompressed in accordance with a corresponding decoding algorithm to generate uncompressed raw image data. In this way, in the present embodiment, when generating full-size uncompressed raw image data, a result of decompression processing performed with reduced-size uncompressed raw image data is used. In other words, the decoded and decompressed data for the LL1 block that is obtained part way through decoding and decompressing the compressed raw image data to generate the full-size uncompressed raw image data in step S305 and step S306 is used as reduced-size uncompressed raw image data to generate the reduced-size uncompressed raw moving image file.

The CPU 103 outputs the generated full-size uncompressed raw image data as a full-size uncompressed raw moving image file. At this point, when outputting the first frame, the file is newly created, but for second and subsequent frames, the newly generated full-size uncompressed raw image data is added to the file that is already there. The generated full-size uncompressed raw moving image file may be saved in the storage unit 105, and may be transmitted to the external apparatus 110 via the communication control unit 106 to be saved. In the present embodiment, it is assumed that the full-size uncompressed raw moving image file is saved in the same folder as the compressed raw moving image file.

Next, in step S308, the CPU 103 determines whether processing up to the final frame for frames included in the compressed raw moving image file that is the processing target has completed. If processing up to the final frame has completed, the processing proceeds to step S309. If there is still an unprocessed frame, the processing proceeds to step S303. In in step S303, the next unprocessed frame is selected, and the foregoing processing repeats. In this way, by repeating from step S303 to step S307, it is possible to process all frames included in the compressed raw moving image file.

Next, in step S309, the CPU 103 determines whether a reduced-size uncompressed raw moving image file has been created. This is because a reduced-size uncompressed raw moving image file is created when each frame image included in the compressed raw moving image file can be subject to a hierarchical decode, but this file cannot be created in the case where a hierarchical decode is not possible. Here, the determination may be performed based on the details of the foregoing flag information of the management information obtained in step S302. In a case of creating a reduced-size uncompressed raw moving image file, the processing proceeds to step S310. If the file is not to be created, the processing proceeds to step S311. In step S310, the CPU 103 generates the management information of the reduced-size uncompressed raw moving image file (management information for reduced size). Next, in step S311, the CPU 103 generates the management information of the full-size uncompressed raw moving image file (management information for full size).

These two kinds of management information can include identification information that enables identification of whether an associated moving image file is a full-size moving image or a reduced-size moving image. In addition, they can include information indicating the original compressed raw moving image file, information indicating a reduced-size moving image file in the case of a full-size moving image, and information indicating a full-size moving image file in the case of a reduced-size moving image.

By virtue of the present embodiment above, in the case of generating and saving an uncompressed raw moving image file from a compressed raw moving image file, in addition to a full-size uncompressed raw moving image file it is possible to generate and simultaneously save a reduced-size uncompressed raw moving image file in a case where the compressed raw moving image file is subject to hierarchical encoding in accordance with wavelet compression encoding. Consequently, it is possible to switch files to use in accordance with conditions, even with a subsequent workflow that handles an uncompressed raw moving image. Accordingly, in a situation where it is possible to use a reduced-size raw moving image file as a proxy file, by using this file it is possible to execute image processing where a processing load is suppressed.

In addition, description was only given for the case where the sub-band division level=1 in the processing of FIG. 3, but it is possible to generate a reduced image similarly to that described above when the sub-band division level is 2 or more. In such a case, a number of LL blocks is equal to the number of division levels, but reduced-size raw image data may be generated for the LL block of each level. Alternatively, configuration may be taken to generate reduced-size raw image data for the LL blocks of some hierarchical layers. In addition, configuration may be taken so as to, in a case where the size of an image to use in subsequent processing is designated in advance (known), or in a case where a predetermined size has been designated by a user, generate a reduced-size raw image data for a predetermined decomposition level corresponding to the size. In addition, configured may be taken so as to, setting the division level=n, create only for LL1, only for LLn, or for any hierarchical layer including LL1 and LLn, for example. Here, because generation for each hierarchical layer of LL2 to LLn is performed in the process for generating the raw image data for LL1, in such a case the reduced image for a respective hierarchical layer may also be generated as a file.

Description was given above of an embodiment where, when a processing target is a compressed raw moving image that can be subject to a hierarchical decode, in principle a reduced-size uncompressed raw moving image is generated and saved. However, in the image processing apparatus 100, whether to generate a reduced-size raw moving image file even if there is a compressed raw moving image that can be subject to a hierarchical decode may be made sellable, Even such an embodiment is included in the scope of the technical concept of the invention. In such a case, a configuration for deciding a default setting for the above setting in accordance with whether a hierarchical decode is possible may be employed. For example, in the case where a hierarchical decode is possible, it is possible to have a setting where "output a reduced-size raw moving image file" is enabled be a default setting. In contrast, in the case where a hierarchical decode is impossible, it is possible to have a setting where "output a reduced-size raw moving image file" is disabled be a default setting. In the above description a "reduced-size raw moving image file" may be referred to as a "proxy file".

Second Embodiment

Next description is given regarding the second embodiment of the invention. In the foregoing first embodiment, description was given of a case of simultaneously generating, for each processing target frame, a full-size uncompressed raw moving image file and a reduced-size uncompressed raw moving image file. In contrast to this, in the present embodiment, processing for generating a reduced-size uncompressed raw moving image file based on whether a hierarchical decode is possible is executed after a full-size uncompressed raw moving image file is generated. Because the configuration of the apparatus and each block in the present embodiment is similar to that described by FIG. 1 and FIG. 2A through FIG. 2C, description thereof is omitted here.

Next, referring to FIG. 4, description is given of processing corresponding to an embodiment of the invention. In the present embodiment, description is given for processing where the CPU 103 converts a compressed raw moving image file to an uncompressed raw moving image file, and saves the uncompressed raw moving image file. Processing corresponding to the flowchart of FIG. 4 is realized by the CPU 103 using and executing an image processing program corresponding to the present embodiment that is stored in the storage unit 105, with the RAM 104 as a work memory. The RAM 104 is also used as a temporary holding region for image data that the CPU 103 processes.

Firstly, in step S401 the CPU 103 selects a compressed raw moving image file that is a processing target, similarly to in step S301. Next, in step S402, the CPU 103 obtains management information of the selected compressed raw moving image file, similarly to in step S302. Next, in step S403, the CPU 103 selects compressed raw image data for an unprocessed frame out of the selected compressed raw moving image file, similarly to in step S303. Next, in step S404, the CPU 103 generates full-size uncompressed raw image data by decoding and decompressing the one frame's worth of compressed raw image data selected in step S403. In a case where compressed raw moving image data that cannot be subject to a hierarchical decode is a processing target, in this step it is decoded and decompressed in accordance with a corresponding decoding algorithm to generate uncompressed raw image data. The generated full-size uncompressed raw image data is outputted as the fill-size uncompressed raw moving image file, and saved in the storage unit 105 or the like, similarly to in the first embodiment.

Next, in step S405, the CPU 103 determines whether processing up to the final frame for frames included in the compressed raw moving image file that is the processing target has completed. If processing up to the final frame has completed, the processing proceeds to step S406. If there is still an unprocessed frame, the processing returns to step S403. In in step S403, the next unprocessed frame is selected, and the foregoing processing repeats. In this way, by repeating step S403 and step S404, it is possible to process all frames included in the compressed raw moving image file.

Next, in step S406, the CPU 103 generates and saves management information for the full-size uncompressed raw moving image file (management information for full size). Next, in step S407, the CPU 103 determines, based on the management information obtained in step S402, whether the compressed raw image data can be subject to a hierarchical decode. In the case where a hierarchical decode is possible, the processing proceeds to step S408. In the case where a hierarchical decode is impossible, this processing ends. In step S408, a starting frame of the compressed raw moving image file that is the processing target is selected. Next, in step S409, the CPU 103 decodes and decompresses the LL1 block out of the selected one frame's worth of compressed raw image data, and generates reduced-size uncompressed raw image data. At this point, the CPU 103 may extract in advance, from the compressed raw image data, information on bit position and length of the LL1 block out of the compressed raw image data, read the LL1 block which has this length from the compressed raw image data, and load it into the RAM 104. Information on the length of the LL1 block may be stored at the head of the compressed raw image data for a target frame, or at another location in the compressed raw moving image file.

Next, in step S410, the CPU 103 outputs the reduced-size uncompressed raw image data generated in step S409 as a reduced-size uncompressed raw moving image file. Next, in step S411, the CPU 103 determines whether processing up to the final frame for frames included in the compressed raw moving image file that is the processing target has completed. If processing up to the final frame has completed, the processing proceeds to step S413. If there is still an unprocessed frame, the processing proceeds to step S412, In in step S412, the next unprocessed frame is selected, and the foregoing processing repeats. In this way, by repeating step S409 and step S410, it is possible to generate a reduced-size uncompressed raw moving image file for all of the frames included in the compressed raw moving image file. Next, in step S413, the CPU 103 generates management information for the reduced-size uncompressed raw moving image file (management information for reduced size), and this processing ends.

By virtue of the present embodiment above, in the present embodiment, processing for generating a reduced-size uncompressed raw moving image file based on whether a hierarchical decode is possible is executed after first generating a full-size uncompressed raw moving image file. Consequently, it is possible to reduce a number of times the step for determining whether a hierarchical decode is possible is executed. Note that, in the present embodiment, description was given of an example where processing for saving a full-size uncompressed raw moving image and saving a reduced-size uncompressed raw moving image are executed in order, but this saving processing may be executed in parallel. Consequently, in the present embodiment, it is still possible to switch files to use in accordance with conditions, even with a subsequent workflow that handles an uncompressed raw moving image. Accordingly, in a situation where it is possible to use a reduced-size raw moving image file as a proxy file, by using this file it is possible to execute image processing where a processing load is suppressed.

Description in detail based on the embodiments of the invention was given above, but the invention is not limited to these specific embodiments, and various forms of a scope that does not deviate from e spirit of this invention are included in the invention. Some embodiments described above may be appropriately combined.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-080786, filed on Apr. 14, 2017, which is hereby incorporated by reference herein in its entirety.

What is claimed is:

1. An image processing apparatus, comprising:
one or more processors;
a memory; and
a program stored in the memory which, when executed by the one or more processors, causes the one or more processors to function as:
a decompression unit configured to decompress a compressed raw moving image file to generate an uncompressed raw moving image file, wherein the decompression unit
generates a full-size uncompressed raw moving image file from full-size uncompressed raw image data obtained by decompressing each of a plurality of pieces of compressed raw image data included in the compressed raw moving image file, and
when the compressed raw image data is data that has been hierarchically compressed, generates a reduced-size uncompressed raw moving image file from reduced-size uncompressed raw image data obtained by decompressing some data of each of the plurality of pieces of compressed raw image data,
wherein, when the compressed raw image data is data that is hierarchically compressed, the decompression unit generates the reduced-size uncompressed raw moving image file from the reduced-size uncompressed raw image data obtained part way through generating the full-size uncompressed raw image data.

2. The image processing apparatus according to claim 1, wherein
each of the plurality of pieces of compressed raw image data is compressed by using a wavelet transform, and
the decompression unit generates the reduced-size uncompressed raw image data by decompressing data of a low frequency band in the same hierarchical layer in the compressed raw image data as the some data.

3. The image processing apparatus according to claim 2, wherein the decompression unit generates the reduced-size uncompressed raw image data by decompressing the data of the low frequency band of a designated hierarchical layer out of a plurality of hierarchical layers included in the compressed raw image data.

4. The information processing apparatus according to claim 1, wherein
the compressed raw moving image file includes flag information indicating whether the compressed raw image data is hierarchically compressed, and
the decompression unit decides whether to generate the reduced-size uncompressed raw image data based on the flag information.

5. The image processing apparatus according to claim 1, wherein the decompression unit generates corresponding full-size uncompressed raw image data by using the reduced-size uncompressed raw image data obtained by decompressing some of the compressed raw image data.

6. The image processing apparatus according to claim 1, wherein the decompression unit generates the reduced-size uncompressed raw image data after generating the full-size uncompressed raw image data for all of the plurality of pieces of compressed raw image data.

7. The information processing apparatus according to claim 1, wherein
if the reduced-size uncompressed raw moving image file is generated,
information indicating the reduced-size uncompressed raw moving image file is associated with the full-size uncompressed raw moving image file, and
information indicating the full-size uncompressed raw moving image file is associated with the reduced-size uncompressed raw moving image file.

8. The image processing apparatus according to claim 1, wherein information indicating a corresponding compressed raw moving image file and information indicating a size of uncompressed raw image data included in the corresponding compressed raw moving image file are associated with the generated uncompressed raw moving image file.

9. An image processing method executed by an image processing apparatus comprising one or more processors, a memory, and a program stored in the memory which, when executed by the one or more processors, causes the one or more processors to function as a decompression unit configured to decompress a compressed raw moving image file to generate an uncompressed raw moving image file,
wherein the method comprises:
by the decompression unit,
generating a full-size uncompressed raw moving image file from full-size uncompressed raw image data obtained by decompressing each of a plurality of pieces of compressed raw image data included in the compressed raw moving image file, and
when the compressed raw image data is data that has been hierarchically compressed, generating a reduced-size uncompressed raw moving image file from reduced-size uncompressed raw image data obtained by decompressing some data of each of the plurality of pieces of compressed raw image data,
wherein, when the compressed raw image data is data that is hierarchically compressed, the decompression unit generates the reduced-size uncompressed raw moving image file from the reduced-size uncompressed raw image data obtained part way through generating the full-size uncompressed raw image data.

10. A non-transitory computer-readable storage medium storing a program that, when executed by a processor of an image processing apparatus causes the processor to function as a decompression unit configured to decompress a compressed raw moving image file to generate an uncompressed raw moving image file, wherein the decompression unit:
- generates a full-size uncompressed raw moving image file from full-size uncompressed raw image data obtained by decompressing each of a plurality of pieces of compressed raw image data included in the compressed raw moving image file, and
- when the compressed raw image data is data that has been hierarchically compressed, generates a reduced-size uncompressed raw moving image file from reduced-size uncompressed raw image data obtained by decompressing some data of each of the plurality of pieces of compressed raw image data,
- wherein, when the compressed raw image data is data that is hierarchically compressed, the decompression unit generates the reduced-size uncompressed raw moving image file from the reduced-size uncompressed raw image data obtained part way through generating the full-size uncompressed raw image data.

\* \* \* \* \*